Jan. 30, 1945. H. V. ALLISON 2,368,397
ABRASIVE TUBE DRILL
Filed May 21, 1940
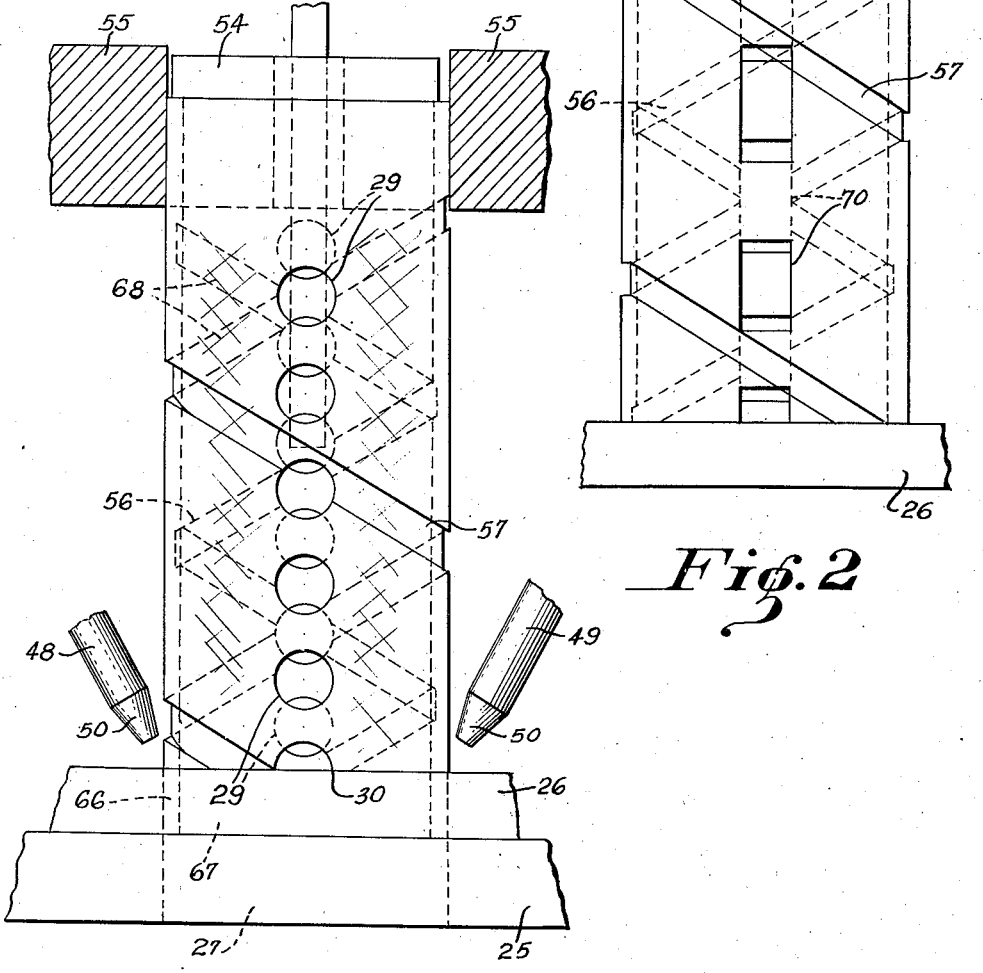
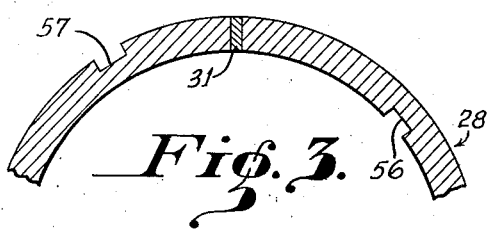
Inventor:
HUGH V. ALLISON
By John H. Hanrahan
Attorney

Patented Jan. 30, 1945

2,368,397

UNITED STATES PATENT OFFICE 2,368,397

ABRASIVE TUBE DRILL

Hugh V. Allison, Fairfield, Conn., assignor to The Allison Company, Bridgeport, Conn., a corporation of Connecticut Application May 21, 1940, Serial No. 336,334

2 Claims. (Cl. 125—20)

This invention relates to new and useful improvements in cutting tools and has particular relation to an abrasive tube drill.

The objects and advantages of the invention will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is an enlarged vertical sectional view through my abrasive tube drill;

Fig. 2 is a view similar to Fig. 1 but showing a different shape of openings in the walls of the drill; and Fig. 3 is a further enlarged sectional view through the seam portion of my abrasive tube drill.

Mounted on a support is a work support 25 on the upper side of which is disposed a sheet of glass or the like 26, which is to be drilled.

Work support 25 has an opening 27 therethrough for a purpose to be disclosed. Mounted by the chuck 24 is a thin-walled abrasive tube drill 28 comprising an elongated tubular body of a bond and abrasive particles. Preferably the wall thickness of this drill is not over five-sixteenths of an inch. This drill is prepared by mixing together any suitable bonding material, as rubber, and a suitable abrasive grain.

The mixture is sheeted to the desired thickness and then a piece is cut from the sheet and such piece being of a predetermined size is rolled about a mandrel and its ends are sealed together making the tube which is then vulcanized or otherwise treated to cure the bond.

A series of openings 29 in the walls of the drill function in a manner to be described but here it is noted the openings are spaced vertically from one another and that the alternate openings are in opposite wall portions of the tube in overlapping relation so that as the body wears down during use, a second opening breaks through the operating end of the body as the body wears past the first opening so that substantially at all times there is in the operating end of the drill a notch similar to that shown at 30.

In making the drill a piece of Cellophane or the like is wrapped about a mandrel of the proper diameter and a piece cut from the sheet and being provided with the openings 29, is wrapped about the covered mandrel. Preferably the sizes are such that the edges of the abrasive sheet come into substantially abutting relation and such edges are then sealed together with a rubber cement or the like as at 31 in Fig. 3. With this construction it is noted that there is no increase in the wall thickness of the drill at the juncture of its edges. Now a second piece of Cellophane or the like is wrapped about the sheet on the mandrel and the product placed in an oven to vulcanize the bond when the latter is of rubber or, when a bond requiring other treatment for curing is used, the final treatment is determined by the type of bond used.

The inner ends of tubes 48 and 49 are connected with suitable source of coolant (not shown) which is preferably under pressure. At their forward ends the tubes are bent to extend downwardly and their free or discharge ends are preferably flattened providing nozzles 50 whereby to have the tubes discharge the coolant in a flat ribbon-like stream. It is noted that the tube ends 50 are positioned to direct coolant downwardly toward the leading or operating end of the drill 28.

Located in the upper end of the drill is a plug 54 which may be of lead or the like and which serves to prevent the upper end of the drill being crushed by the jaws 55 (see Fig. 1) of the chuck when said jaws are tightened onto the drill as will be understood. Particularly when long drills are provided, they may be formed with spiral grooves 56 and 57 in their inner and outer surfaces beginning at their leading or cutting ends for the carrying off of chips and the like from a cut as will appear.

In use the drill cuts through the work as suggested by the dotted lines 66 in Fig. 1 and removes or cuts from the work the disc 67 encompassed by said dotted lines in said figure.

During the cutting operation, the coolant being directed under pressure toward the leading end of the drill, enters the same through the notch in the said end and moves upwardly in the drill and is thrown from the latter through one of the upper openings in the walls thereof. This action of the coolant serves to cool the drill and the work and also to wash from the cut particles and the like whereby the cutting end of the drill has a clean surface on which to work and its cutting action is not impeded by the presence of loose particles in the cut. Depending on the pressure with which the coolant is supplied, its path in the drill varies and the height it rises within the drill is changed. When the drill is provided with the spiral grooves, the coolant serves to wash particles and the like from a cut being made and to carry such debris upwardly through said grooves and out of the cut.

The drill 28 is particularly adapted for the drilling of holes in hard materials such as glass, porcelain, glazed tile, marble, hard rubber, plastics, and the like. The present drill provides means for rapidly drilling holes in such materials and for the drilling of holes without chipping and the like. Coolant is directed onto and around the abrasive drill in a manner to cool it and the work and to wash from the cut particles and the like. Water may be used as the coolant and when oil is used as a coolant it is preferred to bond the abrasive drill with an oil resistant bond as for example the copolymer of butadiene and acrylic acid nitrile known commercially as Perbunan.

For the purpose of strengthening the drill metal fibres 68, as steel wool, are mixed with the bond and abrasive particles prior to the sheeting of the mix and such fibres disposed at random in the completed drill materially strengthens the same. In addition, such metal fibres assist in distributing the heat generated during cutting and thus prevent the concentration of the generated heat in the leading or cutting end of the drill or tube.

Attention is directed to the fact that the openings in the walls of the drill need not be circular. Thus in Fig. 7 the drill generally designated 69 is provided with rectangular openings 70. As shown, these openings are in spaced relation to one another with alternate openings in opposite sides of the drill and preferably the arrangement is such that the openings in one side of the drill slightly overlap those in the other side thereof. With the rectangular shape openings the notches in the end of the drill are of constant width.

Having thus set forth the nature of my invention, what I claim is:

1. In an abrasive tube drill, an elongated one piece thin walled body circular in transverse section, said body of uniform texture from end to end and comprising abrasive particles and metal wool fibres, a rubber bond securing said particles and metal wool fibres in place in uniform distribution throughout said body, said body of uniform diameter and wall thickness from end to end whereby each end of the body is adapted to be received by the same structure of chuck and each such end is adapted to form the leading edge of the drill, and said body wall of not more than five thirty-secondths of an inch in thickness whereby said metal wool fibres may conduct heat rapidly from the leading edge of the body back into the latter whereby to have the entire leading end portion of the body of more even temperature during a drilling operation to prevent concentration of heat at any one point on an article being drilled.

2. In an abrasive tube drill, an elongated one piece thin walled body circular in transverse section, said body of uniform texture from end to end and comprising abrasive particles and metal wool fibres, an organic bond securing said particles and metal wool fibres in place in uniform distribution throughout said body, said body of uniform diameter and wall thickness from end to end whereby each end of the body is adapted to be received by the same chuck structure and each such end is adapted to form the leading edge of the drill, and said body wall of not more than five thirty-secondths of an inch in thickness whereby said metal wool fibres may conduct heat rapidly from the leading edge of the body back into the latter whereby to have the entire leading end portion of the body of more even temperature during a drilling operation to prevent concentration of heat at any one point on an article being drilled.

HUGH V. ALLISON.